United States Patent Office 2,996,491
Patented Aug. 15, 1961

2,996,491
CONTROL OF PENTANE-SOLUBLE POLYMERS IN THE POLYMERIZATION OF PROPYLENE
James L. Jezl, Swarthmore, Habet M. Khelghatian, Springfield, and Louise D. Hague, Villanova, Pa., assignors to Sun Oil Company, Philadelphia, Pa., a corporation of New Jersey
No Drawing. Filed Aug. 4, 1960, Ser. No. 47,352
4 Claims. (Cl. 260—93.7)

This invention relates to the polymerization of propylene and more particularly to a catalytic system effective to reduce the production of polymers soluble in boiling pentane or heptane while maintaining the rate of polymerization of heptane-insoluble polymer.

It is known that propylene may be polymerized to a solid, predominantly crystalline polymer by subjecting the monomer, in an inert liquid hydrocarbon, to the action of a metal halide-metal alkyl complex catalyst. A favored catalyst in commercial operations is a titanium trichloride complex with aluminum triethyl, although other halides such as titanium tetrachloride may be used, and other alkyls, such as aluminum triisobutyl, aluminum triisopropyl, or aluminum tridecyl may be substituted for the aluminum triethyl. Aluminum alkyl halides, such as aluminum ethyl dichloride or aluminum diethyl chloride may also be used as catalyst components. Reaction conditions include a temperature of from 30° C. to 200° C., preferably from 70° C. to 90° C., and pressures sufficient to maintain a propylene concentration in the reaction medium of from 50% to 60% in order to allow the reaction to proceed with desirable rapidity. The process may be operated at atmospheric pressures, however, by bubbling propylene through the reaction medium. Concentration of the titanium halide in the reaction medium is usually from about 0.01 gram to 0.5 gram per 100 cc. of the reaction medium, and the aluminum to titanium ratio should be from about 0.2:1 to about 10:1, preferably from 2:1 to 5:1.

Polymerization in the presence of these catalysts at the indicated reaction conditions will proceed rapidly to yield a solid polymer which apparently consists of three fractions, an amorphous polymer soluble in boiling pentane, a semi-crystalline fraction, believed to be a block polymer having alternate crystalline and amorphous segments, which is soluble in boiling heptane, and an essentially crystalline isotactic fraction insoluble in boiling heptane. In a typical polymerization, the pentane-soluble polymer may amount to about 20% or more of the total polymer. The pentane-soluble polymer, which has at present no known commercial uses, is soluble in the reaction medium at reaction temperatures, and can be readily separated from the pentane-insoluble polymer. It is, however, a waste product, and any means for reducing the ratio of pentane-soluble polymer to isotactic polymer formed in the reaction would present a great economic improvement in the process.

It is an object of this invention to provide a modified coordination complex catalyst system which will drastically reduce the percentage of pentane-soluble polymer produced in the polymerization of propylene while substantially maintaining or increasing the rate of polymerization of pentane-insoluble polymer over that obtained by the use of the coordination complex alone.

It has now been found that this object may be attained by conducting the polymerization in the presence of a catalyst system consisting of titanium trichloride, an aluminum dialkyl halide, and trichloroborazole $$(B_3N_3H_3Cl_3)$$

The atomic ratio of aluminum to titanium in the catalyst system should be from about 0.2:1 to 10:1, preferably from 1:1 to 4:1. The atomic ratio of aluminum to boron must be from about 10:1 to about 1:4, but preferably the ratio is from 4:1 to 1:1, since at ratios above 4:1 the pentane-solubles are not greatly reduced, while at ratios below 1:1 the reaction rate is adversely affected. At the optimum ratio of about 2:1, the pentane-soluble polymer is reduced to about one-third of that obtained in the absence of trichloroborazole, and the production of pentane-insoluble polymer is increased by about 10%. It is essential that the aluminum component of the catalyst be an aluminum dialkyl monohalide, since if an aluminum trialkyl is used, the reaction rate falls off drastically even with small amounts of trichloroborazole. If desired, molecular hydrogen may be present during the polymerization in order to reduce the molecular weight of the polymer.

In order to demonstrate the effect of trichloroborazole in reducing the formation of pentane-soluble polypropylene, the following examples are given.

Example I

A catalyst system is made up by introducing into a reactor n-heptane, hydrogen reduced titanium trichloride, and aluminum diethyl chloride, in quantities such that the heptane solvent contains 0.035 gram of TiCl$_3$ per 100 c.c., and the aluminum to titanium mol ratio is 2:1. Anhydrous and oxygen-free conditions are maintained in the reactor during the addition of the catalyst system. The reactor is then pressured to 140 p.s.i.g. with propylene and the temperature is raised to 160° F. Polymerization commences immediately and is continued for two hours while continuously introducing propylene into the reactor in an amount sufficient to maintain the pressure at 140 p.s.i.g. At the end of the two hour period the unconsumed propylene is vented and methanol is added to destroy the activity of the catalyst. On working up the product it is found that 36% of the polymer is soluble in boiling pentane and that the rate of formation of pentane-insoluble polymer is 0.30 pounds per hour per gallon of heptane.

Example II

The procedure of Example I is repeated, with the addition of sufficient trichloroborazole to the catalyst system to yield a 4:1 atomic ratio of aluminum to boron in the system. The polymeric product is 24% soluble in boiling pentane, and the rate of formation of pentane-insoluble polymer is 0.32 pound per hour per gallon of heptane.

Example III

The procedure of Example II is followed, but the amount of trichloroborazole is increased so that the atomic ratio of aluminum to boron is 2:1. 17% of the product is pentane-soluble, and the rate of formation of pentane-insoluble polymer is 0.35 pound per gallon of heptane per hour.

Example IV

The procedure of Example III is followed, except that 22 parts per million by weight, based on the heptane, of hydrogen are present during the polymerization. The product is 11% pentane-soluble and the rate of formation of pentane-insoluble polymer is 0.33 pound per gallon of heptane per hour.

Example V

The procedure of Example III is followed, except that the amount of trichloroborazole is increased so that the ratio of aluminum to boron is 1:1. The product is 13% soluble in boiling pentane, and the rate of formation of pentane-insoluble polymer is 0.25 pound per gallon of heptane per hour.

*Example VI*

The procedure of Example III is again followed, except that the amount of trichloroborazole is increased to a ratio of aluminum to boron of 0.5:1. The product is 9% soluble in boiling pentane, but the rate of formation of pentane-insoluble polymer has dropped to 0.16 pound per gallon of heptane per hour.

*Example VII*

The procedure of Example I is followed, substituting aluminum triethyl for the aluminum diethyl monochloride and reducing the content of $TiCl_3$ to 0.0225 gram per cc. The product is 38% soluble in boiling pentane, and the rate of production of pentane-insoluble polymer is 0.63 pound per gallon of heptane per hour.

*Example VIII*

A polymerization is carried out as in Example VII except that sufficient trichloroborazole is added to give an atomic ratio of aluminum to boron of 2:1. The product is only 10% soluble in boiling pentane, but the rate of production of pentane-insoluble polymer has dropped to 0.13 pound per gallon of heptane per hour.

*Example IX*

The procedure of Example III is followed, substituting aluminum diisobutyl monochloride for aluminum diethyl monochloride. Essentially the same results are obtained.

The invention claimed is:

1. A catalytic system consisting essentially of titanium trichloride, an aluminum dialkyl halide, and trichloroborazole in an inert hydrocarbon solvent, wherein the atomic ratio of aluminum to titanium is from 0.2:1 to 10:1 and the atomic ratio of aluminum to boron is from 10:1 to 1:4.

2. The catalyst system according to claim 1 in which the aluminum dialkyl halide is aluminum diethyl monochloride.

3. A process for polymerizing propylene which comprises contacting propylene at a temperature from 30° C. to 200° C. with a catalyst system consisting essentially of titanium trichloride, an aluminum dalkyl halide, and trichloroborazole in an inert hydrocarbon solvent, wherein the atomic ratio of aluminum to titanium is from 0.2:1 to 10:1 and the atomic ratio of aluminum to boron is from 10:1 to 1:4, and recovering a solid, predominantly isotactic polymer of propylene.

4. The process according to claim 3 in which the aluminum dialkyl halide is aluminum diethyl monochloride.

References Cited in the file of this patent

UNITED STATES PATENTS 2,892,869  Groszos et al. _____ June 30, 1959

FOREIGN PATENTS 526,101  Italy _____ May 14, 1955